United States Patent Office 2,968,638
Patented Jan. 17, 1961

2,968,638
PAINT RECLAIMING
Joseph G. Meckler, 4030 Colony Road,
South Euclid, Ohio
No Drawing. Filed Feb. 18, 1959, Ser. No. 793,964
19 Claims. (Cl. 260—21)

The present invention relates to paint reclaiming and, more particularly, to reclaiming a resin-containing paint from the lost overspray in the spray technique of painting which is normally insoluble or only slightly soluble in the usual paint vehicles.

Spray painting is very often used industrially to coat various articles of manufacture, particularly household appliances such as refrigerators, washing machines, and the like. Ordinarily, the article is placed in a booth during the spraying operation to confine within a relatively small area the unavoidable sprays of paint which miss and pass the article to be painted. The resulting unused paint is termed "overspray" and can amount to quite a substantial volume in commercial practice and thereby represent an appreciable financial loss.

Various techniques have been suggested to recover overspray. One popular method is to discharge a curtain of water from near the ceiling of the spray booth and behind the article to be painted and then withdraw the water from the floor of the booth. In this manner, the overspray is caught by the moving curtain of water and carried as a sludge to a common station where it may be recovered from the water, as by the apparatus disclosed in Reissue Pat. 22,615 to Saunders et al.

At some point in the reclaiming of the paint, additional ingredients normally found in paint are usually added to replace those lost by evaporation or otherwise. Accordingly, a solvent such as the xylenes (xylol) may be added to the reclaimed paint-water mixture which can then be concentrated by removing some or all of the water, as by the apparatus of the cited Saunders et al. patent. The reclaimed paint is of almost undiminished utility for painting and, indeed, upon suitable dilution by an organic solvent, if needed, may again be used for spray painting.

In the case of spray painting home appliances such as refrigerators and kitchen cabinets, resin-containing paints such as the urea resins like urea-formaldehyde and melamine formaldehyde and the alkyd resins, are often used because they provide excellent finishes. The use of such urea resins and some of the alkyd resins in paint, however, has made the reclamation of the paint difficult, since such resins are relatively incompatible with or insoluble in the normally employed paint vehicles such as vegetable oils, marine oils, and liquid aliphatic hydrocarbons. The lack of a suitable solvent or admix for recovered paint containing resins of the types indicated has adversely affected the satisfactory and economic reclamation of the paint by the usual methods for more universal application.

I have discovered that resin-containing paints, such as those containing urea resins like urea-formaldehyde and melamine-formaldehyde, can be reclaimed from an aqueous medium by a liquid polymer which is compatible with the resin-containing paint and also provides the desired degree of compatibility with vegetable oils exemplified by linseed oil; marine oils exemplified by menhaden oil; and liquid aliphatic hydrocarbons exemplified by mineral spirits.

The liquid polymer comprises a reaction product of a fatty acid component, a polyhydric alcohol, and an acid anhydride interreacted to a low polymeric state, that is, to a liquid form.

It is, therefore, a principal object of the present invention to provide a method of reclaiming a resin-containing paint and to produce such a reclaimed paint.

Another object is to reclaim a paint containing resins, normally incompatible with vegetable and marine oils and liquid aliphatic hydrocarbons, from an aqueous medium by incorporation therewith the interreaction product of a fatty acid component, a polyhydric alcohol, and an acid anhydride.

A further object is to reclaim a paint containing a urea-aldehyde resin from the water curtain of a spray booth and render it compatible with the indicated oils and hydrocarbon solvents by means of the above-mentioned interreaction product.

Other objects will become apparent as the description proceeds.

To the accomplishment of the foregoing and related ends, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

In accordance with the present invention, I prepare a reclamation agent for a resin-containing paint, by reacting a fatty acid component, a polyhydric alcohol, and an acid anhydride to a liquid polymer form. Such agent renders the resin-containing paint compatible with paint vehicles normally immiscible with such resins.

By the term "fatty acid component," I include an acid of the fatty acid series having a carbon chain of 13 to 17 carbon atoms attached to (that is, in addition to) the carboxyl group. Fatty acids having a less or greater number of carbon atoms are not as successful, apparently because of the differences in molecular weight. The fatty acids may be either saturated or unsaturated. For example, fatty acids that may be used include lauric, myristic, pentadecanoic, palmitic, margaric, linolenic, linoleic, oleic, ricinoleic, and stearic acids.

Initially, the carboxyl group of the acids may be unreacted, but as hereinafter suggested, it apparently undergoes a reaction with the polyhydric alcohol. In place of the fatty acids I may therefore use as the fatty acid component a naturally occurring oil in which the fatty acids are already present as esters, usually glycerides. In fact, the use of such oils for the fatty acid component is preferred, not only because of their ready availability, but because they contain a number of the different fatty acid chains, previously identified, which impart a wider range of physical properties to the resulting liquid reaction product. The presence of a variety of such fatty acid chains also appears to offer a better control for achieving the desired but not critical physical properties of the resulting liquid polymer which are hereinafter noted. Naturally occurring oils which may be used include linseed, soya, tall, and coconut oils.

Since the reclamation agent or liquid polymer should be of relatively simple structure in order to have compatibility with the resin-containing paint, the polyhydric alcohol used in the present invention is also restricted to a relatively simple structure. Accordingly, polyhydric alcohols of only about 2 to 6 carbon atoms should be used, such as ethylene glycol, diethylene glycol, sorbitol, mannitol, carbitol, pentaerythritol, and glycerol. For the acid anhydride, I used a di-carboxylic acid anhydride, such as maleic anhydride, succinic anhydride, and phthalic anhydride.

The resins employed in paints which are particularly troublesome with respect to suitable admixture with the vehicles normally employed in paints are the urea-aldehyde resins, such as urea-formaldehyde and melamine-formaldehyde. Some alkyd resins, for example those used in refrigerator finishes, are also relatively insoluble or immiscible in the usual paint vehicles, so that reclamation is most difficult if at all possible. Such alkyd resins are described in my prior United States Patent No. 2,315,125. Other specific alkyd resins which are normally incompatible with linseed oil and the like and which become compatible when treated in accordance with the present invention are listed in Table A. This table shows the percentage composition of alkyd resins sold under various trade names as well as the percentage volatility of the alkyd material itself.

Specifically, paint vehicles in which the above described urea and alkyd resins cannot be suitably admixed for reclamation purposes without use of the present invention include vegetable oils, marine or fish oils and liquid aliphatic hydrocarbons. Typical of the vegetable oils are linseed oil, soybean oil, tung oil, tall oil, safflower oil, and perilla oil, while marine oils are exemplified by menhaden oil and sardine oil. The liquid aliphatic hydrocarbons may be those obtained from petroleum such as mineral spirits, naphtha, kerosene, and Stoddard solvent. As used in the claims the phrase "normally used paint vehicles" is intended to designate these specifically identified paint vehicles. Such paint vehicles are added in the process of reclaiming a paint to impart desired properties and characteristics and/or a desired fluidity or viscosity.

The proportions of the components used are not critical to the invention. Wide ranges of each are permissible with operative results. For most purposes, about 4500 to 7200 parts by weight of the fatty acid component, about 1300 to 2400 parts by weight of alcohol, and about 1500 to 3100 parts by weight of the acid anhydride are intermixed, although proportions outside of these ranges can be used. Similarly, when a hydrocarbon solvent is added, a range of about 250 to 500 gallons is suggested, based on the foregoing proportions in pounds weight. The fatty acid component appears to be a more critical component in that there is a greater variance in the range and type of polyhydric alcohol that can be used than for the fatty acid component.

To prepare the reclamation agent, the described ingredients are mixed and then heated at elevated temperatures until a liquid polymer of low molecular weight is formed. The resulting liquid polymer is compatible with the aforementioned resin-containing paints. Obviously, the extent of polymeric growth is not critical as long as compatibility with the resin-containing paint is possible. This is easily determined by a simple trial and error process when preparing the reclamation agent. For the purpose of illustration, I have found that a liquid polymer having the following properties is well suited for the purposes of the invention. Such properties or properties close thereto are not to be taken as critical in order to practice the invention:

| | |
|---|---|
| Viscosity (Gardner-Holdt bubble viscosimeter) | A–B |
| Non-volatiles | 70% |
| Acid value (ASTM method) | 30–35 |
| Color (Gardner color standard) | 10–12 |
| Weight per gallon | 8 lbs. |

In one instance, these properties were obtained by heating the ingredients from room temperature to about 480° F. in about 2 to 2.5 hours and then holding the mixture at 480° F. for about 2.5 to 3 hours. This manner of heating, however, need not be followed in all cases.

The exact chemical reaction which takes place between or among the fatty acid component, the polyhydric alcohol, and the acid anhydride is not completely understood. Without intending to limit the disclosure or the claims, it may be theorized that the acid anhydride and polyhydric alcohol, and fatty acid component interact to form an alkyd-type of resin of simple structure which acts as a bridge between the resin-containing paint and the normally used paint vehicles, such as linseed oil and mineral spirits, to give the resulting compatibility. The carboxyl radical of the fatty acid component undoubtedly undergoes reaction, probably with the alcohol to provide esters which also are of relative simple structure and thereby aid in the compatibility of the overall mixture. When naturally occurring oils such as linseed oil are used for the fatty acid component also, such components are generally recognized to be already in ester form, usually as glycerides.

EXAMPLE I

Oleic acid, ethylene glycol, and phthalic anhydride were intermixed in a weight ratio of about 4.5:1.5:1, respectively, and then heated at about 300° F. to about 400° F. until a liquid polymer compatible with a paint containing urea-formaldehyde was produced. The mixture of polymer and paint was reduced with mineral spirits to a desired viscosity.

EXAMPLE II

Linseed oil, ethylene glycol, and maleic anhydride were intermixed in about the same weight ratio as in Example I and then heated at about 300° F. to 450° F. for about three hours until a liquid polymer approximating the physical properties previously noted was obtained. The polymer was added to a resin-containing paint, and the mixture reduced with mineral spirits to a desired viscosity. Kerosene was then miscible with the resulting mixture.

EXAMPLE III

Coconut oil, glycerol, and phthalic anhydride were intermixed in a weight ratio of about 4:1.3:1, respectively, and then slowly heated to about 425° F. until a liquid polymer approximating the physical properties previously noted was obtained. This polymer was mixed with a paint containing melamine-formaldehyde resin and then reduced to a desired viscosity with mineral spirits. It was then possible to add linseed oil to impart desired properties.

EXAMPLE IV

A procedure like the procedure of Example III was carried out except that soya oil, ethylene glycol, and phthalic anhydride were used. About 1 gallon of mineral spirits was added for about every 15 pounds of the resulting liquid polymer, and the entire mix then added to an alkyd-containing paint which had been collected as overspray and in which mineral spirits are normally relatively insoluble. The mineral spirits were now readily soluble with the paint.

EXAMPLE V

It is possible to use more than one representative of each class of reactants. In this example, 3,000 pounds of soya oil, 217 pounds of linseed oil, 899 pounds of phthalic anhydride, and 714 pounds of ethylene glycol were intermixed. This mix was then heated from room temperature up to 480° F. in 2.5 hours and then held at 480° F. for 2.5 to 3 hours until physical properties approximating those previously given were obtained. About 200 to 250 gallons of mineral spirits were then added. The yield was 800 gallons. The resulting reclamation agent was found to impart compatibility to paints having the types of resins previously noted with the described normally used paint vehicles.

EXAMPLE VI

A procedure is carried out like the procedure of Example V except that tall oil is used instead of soya bean oil.

Table A

| Alkyd Resin | Phthalic Anhydride, Percent | Oil, Percent and Type | Solvent Type | Non-Volatile, Percent |
|---|---|---|---|---|
| Beckosol 1303 Rosin Alkyd Modified. | 44 | 34 Soya | Xylol | 50 |
| Beckosol 1307 Pure Alkyd. | 42 | 41 Soya | do | 50 |
| Beckosol 1313 Pure Alkyd. | 42 | 41 Linseed | High Solvency Naphtha. | 50 |
| Beckosol 1323 Pure Alkyd. | 44 | 32 Coconut | Toluol | 60 |
| Falkyd B 242 | 42 | 35 Soya | Xylol | 60 |
| Dyal XAN 1 Pure Alkyd. | 43 | 43 Non-Drying. | do | 60 |
| Dyal XAN 78 Pure Alkyd. | 42 | 33 Coconut | do | 60 |

Other modes of applying the principle of my invention may be employed instead of the one explained, change being made as regards the composition and method hereing disclosed, provided the ingredients or steps stated by any of the following claims or the equivalent of such stated ingredients or steps be employed.

I therefore, particularly point out and distinctly claim as my invention:

1. A method of reclaiming a resin-containing paint substantially insoluble in a normally used paint vehicle comprising the steps of interreacting a fatty acid component having a 13 to 17 carbon chain attached to the carboxyl group, a polyhydric alcohol having from 2 to 6 carbon atoms, and an acid anhydride selected from the class consisting of maleic anhydride, succinic anhydride, and phthalic anhydride to a liquid polymeric state compatible with the resin-containing point; admixing the liquid polymer with such paint; and then adding such normally used paint vehicle to the admixture, such liquid polymer serving as a bridging agent between such resin-containing paint and such paint vehicle to render such paint and vehicle mutually compatible.

2. A method of reclaiming a resin-containing paint substantially insoluble in a normally used paint vehicle comprising mixing together a fatty acid component having a 13 to 17 carbon chain attached to the carboxyl group, a polyhydric alcohol having from 2 to 6 carbon atoms, and an acid anhydride selected from the class consisting of maleic anhydride, succinic anhydride, and phthalic anhydride; heating the mixture to produce a liquid polymer compatible with the resin-containing paint; admixing the liquid polymer with such paint; and then adding such normally used paint vehicle to the admixture, such liquid polymer serving as a bridging agent between such resin-containing paint and such paint vehicle to render such paint and vehicle mutually compatible.

3. A method as claimed in claim 2 wherein said fatty acid component is a mono-carboxylic acid selected from the class consisting of lauric, myristic, pentadecanoic, palmitic, margaric, linolenic, linoleic, oleic, ricinoleic, and stearic acids.

4. A process as claimed in claim 2 wherein said fatty acid component is an oil selected from the class consisting of linseed, soya, tall, and coconut oils.

5. A method as claimed in claim 2 wherein the resin of such resin-containing paint is a urea-aldehyde selected from the group consisting of urea-formaldehyde and melamine-formaldehyde.

6. A method as claimed in claim 2 wherein the resin of such resin-containing paint is an alkyd resin.

7. A method as claimed in claim 2 wherein such normally used paint vehicle added to the admixture is a vegetable oil selected from the group consisting of linseed oil, soybean oil, tung oil, tall oil, safflower oil, perilla oil, and coconut oil.

8. A method as claimed in claim 2 wherein such normally used paint vehicle added to the admixture is a marine oil.

9. A method as claimed in claim 2 wherein such normally used paint vehicle added to the admixture is a liquid aliphatic hydrocarbon selected from the group consisting of mineral spirits, naphtha, kerosene, and Stoddard solvent.

10. An overspray recovery process for reclaiming a resin-containing paint from an aqueous collecting medium in which the paint is substantially insoluble and for rendering such paint miscible in normally used paint vehicles, comprising mixing together a fatty acid component having a 13 to 17 carbon chain attached to the carboxyl group, a polyhydric alcohol having from 2 to 6 carbon atoms, and an anhyride selected from the class consisting of maleic anhydride, succinic anhydride, and phthalic anhydride, heating the mixture to produce a liquid polymer, adding at least one of such normally used paint vehicles to the polymer, adding the polymer-vehicle mixture to the paint to reclaim it from the aqueous medium, such liquid polymer serving as a bridging agent between such resin-containing paint and such paint vehicle to render the paint and vehicle mutually compatible, and removing at least some of the water from said medium.

11. An overspray recovery process for reclaiming a resin-containing paint from a collecting water curtain in which the paint is substantially insoluble by means of a fatty acid component and hydrocarbon solvent normally incompatible with said paint, comprising mixing together about 4500 to 7200 parts by weight of an oil selected from the class consisting of linseed, soya, tall, and coconut oils, about 1500 to 3100 parts by weight of phthalic anhydride, and about 1300 to 2400 parts by weight of ethylene glycol, heating the mixture up to 480° F. for a sufficient time to produce a liquid polymer soluble with the resin-containing paint, diluting the liquid polymer with about 250 to 300 gallons of said hydrocarbon solvent, adding the polymer-solvent mixture to the resin paint-water mixture to dissolve the paint in the former, such liquid polymer serving as a bridging agent between such resin-containing paint and such hydrocarbon solvent to render the paint and solvent mutually compatible, and concentrating the resulting intermix by removing at least some of the water.

12. A resin-containing paint reclaimed from an aqueous medium including a reclamation agent compatible with the paint and mixed therewith, and a sufficient amount of a hydrocarbon solvent to replace at least some of the paint solvent vehicle lost and to impart a desired dilution, said hydrocarbon solvent being normally incompatible with said resin-containing paint, said reclamation agent consisting essentially of a fatty acid component having a 13 to 17 carbon chain attached to the carboxyl group, a polyhydric alcohol having 2 to 6 carbon atoms, and an anhydride selected from the class consisting of maleic anhydride, succinic anhydride, and phthalic anhydride, interreacted to produce a liquid polymer soluble with said paint, said liquid polymer serving as a bridging agent between said resin-containing paint and said hydrocarbon solvent to render the paint and solvent mutually compatible.

13. A paint as claimed in claim 12 wherein the resin contained by the paint is a urea-aldehyde selected from the class consisting of urea-formaldehyde and melamine-formaldehyde.

14. A paint as claimed in claim 12 wherein the resin contained by the paint is an alkyd resin.

15. A resin-containing paint as claimed in claim 12 wherein said fatty acid component is a mono-carboxylic acid selected from the class consisting of lauric, myristic, pentadecanoic, palmitic, margaric, linolenic, linoleic, oleic, ricinoleic, and stearic acids.

16. A resin-containing paint as claimed in claim 12 wherein said hydrocarbon solvent is one selected from the class consisting of mineral spirits, naphtha, kerosene, and Stoddard solvent.

17. A resin-containing paint as claimed in claim 12 wherein said fatty acid component is an oil selected from the class consisting of linseed, soya, tall, and coconut oils.

18. A resin-containing paint recovered from the water curtain of the spray process of painting including a reclamation agent compatible with the paint and mixed therewith; and a sufficient amount of a hydrocarbon solvent to replace at least some of the paint solvent vehicle lost and to impart a desired dilution; said hydrocarbon solvent being normally incompatible with said resin-containing paint; said reclamation agent consisting essentially of about 4500 to 7200 parts by weight of an oil selected from the class consisting of linseed, soya, tall, and coconut oils; about 1300 to 2400 parts by weight of ethylene glycol; and about 1500 to 3100 parts by weight of phthalic anhydride, heated together up to 480° F. for a sufficient time to provide a liquid polymer soluble with the resin-containing paint; said liquid polymer serving as a bridging agent between said resin-containing paint and said hydrocarbon solvent to render the paint and solvent mutually compatible.

19. A resin-containing paint as claimed in claim 18 wherein said hydrocarbon solvent is present in about 250 to 300 gallons for the quantities indicated for the reclamation agent in pounds weight.

References Cited in the file of this patent

UNITED STATES PATENTS

| | | |
|---|---|---|
| Re. 22,615 | Saunders et al. | Mar. 6, 1945 |
| 2,074,814 | Smith | Mar. 23, 1937 |
| 2,369,683 | Moore | Feb. 20, 1945 |